United States Patent [19]

Critchlow et al.

[11] 4,298,275
[45] Nov. 3, 1981

[54] RADIALLY VARYING TRANSMISSION FILTER FOR WIDE ANGLE COPYING DEVICE

[75] Inventors: James A. Critchlow, Macedon, N.Y.; Donna U. Ozern, Amherst, N.H.

[73] Assignee: Xerox Corporation, Stamford, Conn.

[21] Appl. No.: 110,062

[22] Filed: Jan. 7, 1980

[51] Int. Cl.³ ............................................. G03B 27/72
[52] U.S. Cl. ...................................... 355/71; 350/314; 354/296
[58] Field of Search .................. 355/35, 37, 67, 70, 355/71; 354/296, 270; 350/163, 164, 166, 266, 314

[56] References Cited

U.S. PATENT DOCUMENTS

| | | | |
|---|---|---|---|
| 2,356,694 | 8/1944 | Potter et al. | 350/314 X |
| 3,279,311 | 10/1966 | Lichtner | 354/296 X |
| 3,397,023 | 8/1968 | Land | 350/160 |
| 3,669,538 | 6/1972 | Fowler | 355/67 |
| 3,777,135 | 12/1973 | Rees | 355/70 X |
| 3,981,565 | 9/1976 | Karasawa | 350/266 |
| 4,229,097 | 10/1980 | Vulmiere et al. | 355/35 |

OTHER PUBLICATIONS

IBM Technical Disclosure Bulletin, "Illumination Compensation for Cos⁴θ Lens Attenuation", G. W. Hobgood, Jr., vol. 14, No. 11, Apr. 1972, p. 3324.
Lenses in Photography, The Practical Guide to Optics for Photographers, Ch. VIII, "Lens Attachments", Kingslake, publ. for Garden City Books, Garden City, N.Y. 1951, p. 143.

Primary Examiner—Richard A. Wintercorn

[57] ABSTRACT

A neutral density filter with a radially varying transmission is inserted in close proximity to the projection lens in a photocopier optical system. The filter has a transmission profile which provides compensation for photoconductor irradiance falloff due to $\cos^4$ as well as other circularly symmetrical non-uniformities in the optical system such as lens exit pupil distortion.

6 Claims, 8 Drawing Figures

RADIALLY VARYING TRANSMISSION FILTER FOR WIDE ANGLE COPYING DEVICE

BACKGROUND OF THE INVENTION

This invention relates generally to a full frame copying device and, more particularly, to an improved optical system adapted to provide a uniform irradiance at an image plane.

In electrophotographic copiers, the areas of a charged photoconductive surface which are irradiated by a light image are discharged, the degree of discharge dependent upon the intensity of the impinging light rays. It is, therefore, desirable that the light ray intensity vary only due to the reflectance characteristics of the original document being copied rather than due to changes introduced by the imaging components. Stated in another manner, the optimum system would be one providing uniform photoconductor irradiance given a uniformly reflecting document.

Of the factors affecting relative illumination at an image plane, the most well known is the cosine (cos) variation caused by the lens wherein the illumination at an angle plane is proportional to the $\cos^4$ of the angle between the optical axis and the field beam. Thus, photoconductor irradiance decreases as radial distance from the system optical axis increases. Various approaches have been devised to compensate for this effect. Typically, in slit-scanning systems, a sheet of opaque material having a butterfly slit formed thereon is employed with the area of the slit being inversely proportional to the illumination profile. Other similar techniques employ masks having slits of this nature integral with the lens. Still other scanning systems utilize a variable density filter in the optical path whose transmissiveness varies inversely to the $\cos^4$. Such a device is described in IBM Technical Disclosure, Vol. 14, No. 11 (April 1972).

In full frame imaging systems wherein an entire document is typically illuminated by flash illumination, efforts to compensate for $\cos^4$ light falloff have emphasized locating light sources in such a way that the document edges are illuminated to a greater degree than central areas. Two such systems are disclosed in U.S. Pat. No. 3,669,538 (Fowler) and U.S. Pat. No. 3,777,135 (Rees). These compensation techniques are fairly effective for relatively small half field angles (20°) but as this field angle increases, the $\cos^4$ falloff becomes steeper and other circularly symmetric non-uniformities within the optical system contribute still further to illumination non-uniformity at the image plane. (Also, the increased edge illumination produced by these systems may not be entirely suitable for corner-registered document systems.) These non-uniformities include lens transmission variations and lens exit pupil distortion. The cumulative effect of these non-uniformities combined with the $\cos^4$ dropoff result in often severe problems in obtaining uniform exposure at the photoconductor.

SUMMARY OF THE INVENTION

It is therefore, the principal object of the present invention to provide uniform imaging of a document in a full frame, wide angle copying system by compensating for the various non-uniformities within the optical system as well as compensating for the effects of $\cos^4$ variation.

This object is accomplished by introducing a neutral density filter with a radially varying, circularly symmetric transmission profile into the optical system. The filter consists of a central area of radially varying opacity and an outer clear annular region. The filter is designed to provide a transmission profile at the photoconductor which compensates for the effects of $\cos^4$ as well as circularly symmetrical non-uniformities such as lens exit pupil distortion.

DESCRIPTION

Figure 1:
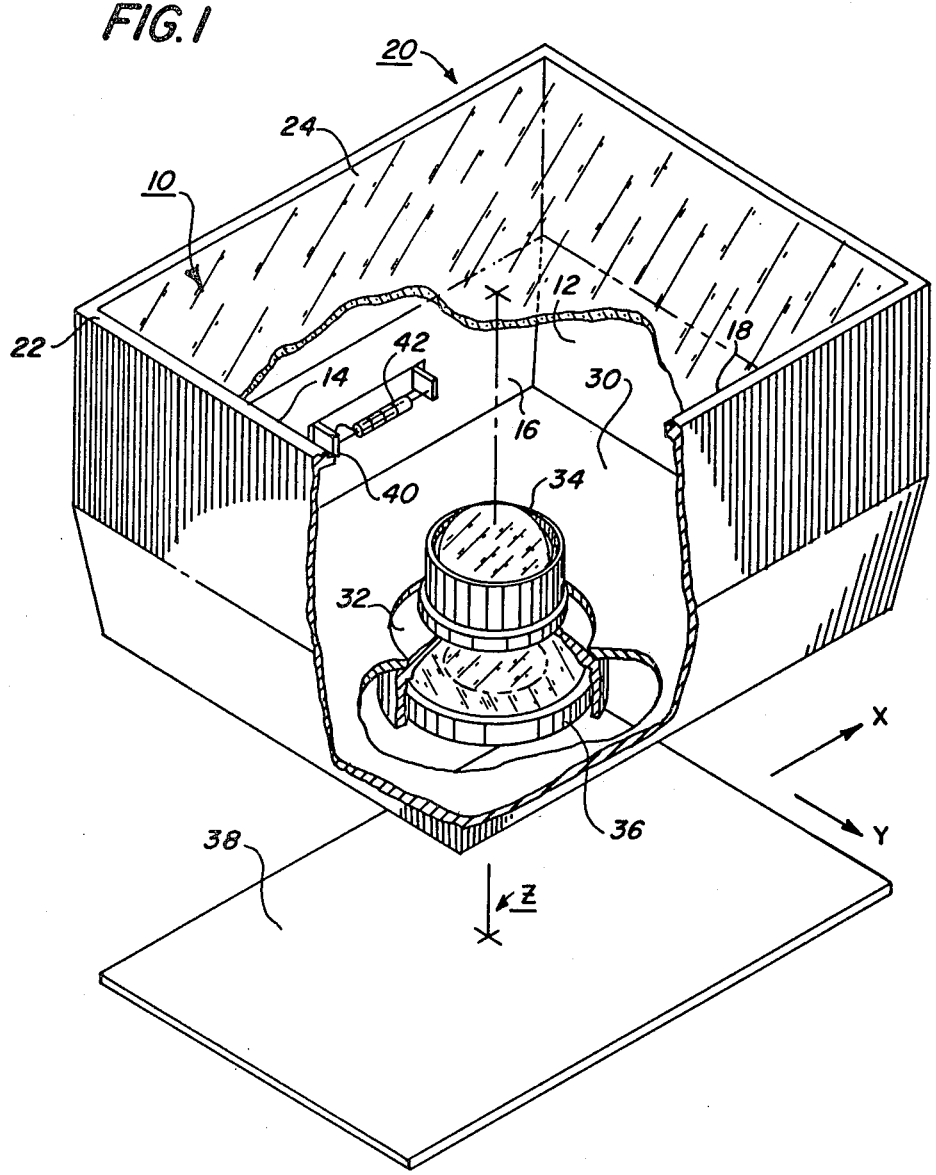
FIG. 1 is a view of an optical system for a full frame copier with the relative illumination filter of the present invention located in the optical path.

Referring now to FIG. 1, there is shown a full frame exposure optical system which utilizes a relative illumination (RI) filter constructed and positioned according to the principles of the present invention.

A completely enclosed housing 10, generally rectangular in shape, has a first pair of opposing side walls 12, 14 and a second pair of opposing side walls 16, 18. An upper, or top wall 20 includes a rectangular aperture 22 which, at the center thereof, accommodates a glass platen 24 forming the object plane. The platen may have a hinged cover (not shown) which may be pivoted upward to permit open platen copying of materials such as books.

The lower, or bottom wall 30 has an aperture 32 therein which accommodates a circular lens 34.

Relative illumination (RI) filter 36 is fixedly mounted below lens 34 by a mounting bracket (not shown) with the center of the filter on lens optical axis Z and the XY plane of the filter perpendicular to the axis. Filter 36 is a neutral density filter having a transmission profile that increases with radial displacement from the optical axis as described in greater detail below.

An image plane 38 which may, for example, be a photoconductive sheet to which a charge has been applied, is positioned for exposure to light reflected from a document (not shown) on platen 24, projected by lens 34 and transmitted through filter 36. The optical system also includes a flash illumination source 42 which may be a periodically pulsed xenon lamp. The interior of the housing 10 is preferentially coated with a substantially diffusely reflecting material. When lamp 42 is flashed, a substantially uniform illumination of a document placed on the platen is obtained. The document image is projected through lens 34 and through filter 36 which attenuates the amount of light passing through in accordance with its transmission profile. The compensated image falls upon plane 38 selectively discharging the sheet and resulting in formation of a latent electrostatic image thereon.

In order to understand the problems involved in obtaining image plane uniformity in an optical system as shown in FIG. 1, a more detailed discussion of the factors contributing to non-uniformity follows.

Figure 2:
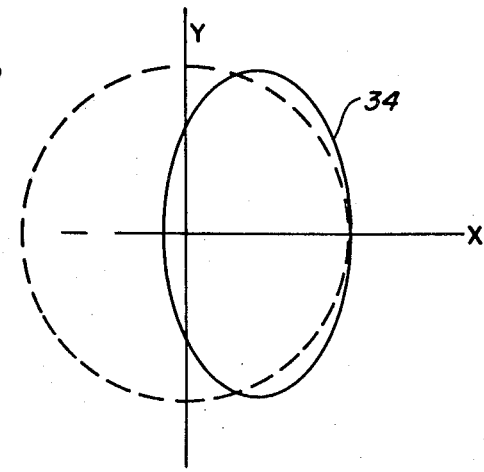
FIG. 2 is a sketch illustrating exit pupil distortion of the lens shown in FIG. 1 when the lens is viewed from an extreme angle at the edges of a platen.
Figure 3:
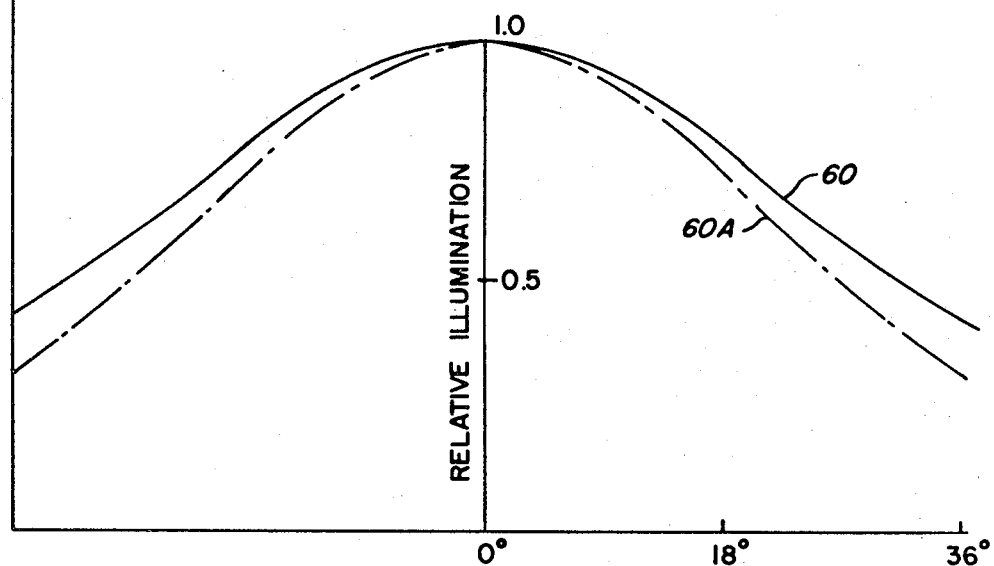
FIG. 3 is a graph which illustrates the relative illumination falloff at a photoconductive image plane due to the effects of $\cos^4$ alone as compared with $\cos^4$ combined with other system non-uniformities.

As previously mentioned, the most severe problem is the $\cos^4$ illumination falloff. Filters are known which provide compensation by having a maximum density at the center and having density decrease in accordance with the $\cos^4$ curve until 100% transmission is obtained at the edge of field. These filters are effective at short radial distances from the optical axis but their effectiveness decreases as the outer limits of field angle are approached. The reason for this is that the relative illumination in the image plane is governed by at least two other factors. These effects are shown in the following formula:

$$RI = T_\theta \frac{A_\theta}{A_A} \cos^4 \theta$$

where $T_\theta$ is the transmission of the lens as a function of lens half angle $\theta$; $A_\theta$ is the area of the exit pupil at a given angle $\theta$ as projected onto the axial exit pupil plane:: and $A_A$ is the area of the exit pupil on axis. The factor $A_\theta/A_A$ is referred to as the pupil distortion function. This effect is due to the effective change in shape and position of the exit pupil when viewed at various field angles through the lens elements between the lens aperture and the image plane. This pupil distortion is a function of the lens design and generally worsens with increasing field angle. FIG. 2 shows the exit pupil of lens 34 of FIG. 1 when viewed at two field positions on axis (dotted) and 36° in the $+\times$ direction (solid). Note that the center of the exit pupil has shifted towards the direction of view and the pupil has gone from a circular pupil to an ellipse with its minor axis coinciding with the x axis. The effect of this pupil distortion on lens transmission can be seen in the graph in FIG. 3 which plots relative illumination at the image plane at a nominalized axial distance from the lens for the cases of $\cos^4$ falloff only (curve 60) and $\cos^4$ plus lens-introduced non-uniformities (curve 60A). The increasing difference between the curves at the outer field angles represents the additional decrease of illumination at the outer portions of a projected image. The filter of the present invention has been designed to provide compensation for these cumulative effects on image plane non-uniformity and a specific example is given in the following description:

A filter 36 was designed to provide the optical system of FIG. 1 with an overall relative illumination variation of ±2% at the image plane. The optical system has the following characteristics:

Field angle range: 0° to 40°

Lens 34: $f/10$, 6" focal length 1× to 0.647× magnification

Lens exit pupil to image plane distance: 312 mm

Filter 36 to exit pupil distance: 78 mm

The relative illumination at the image plane is first determined in the absence of a filter and the filter design is then calculated by a trial and error iterative process. More specifically, a series of equations is derived which describes the lens exit pupil change at a number of field angle positions. Using these equations, light ray bundles which can pass through each area are calculated thus defining relative illumination at the image plane for these points. A given level of illumination is pre-defined at the desired uniform level. A filter transmission profile is constructed by an interactive process which consists of calculating optimum points for the filter to intercept the light bundles emerging from the respective pupil areas as well as optimum density to achieve the desired illumination level. From this process, several annular rings of varying density are defined for the filter which form the core of the transmission profile. An interpolation is then made between these transmission values to generate the complete filter profile shown in FIG. 4.

Figure 4:
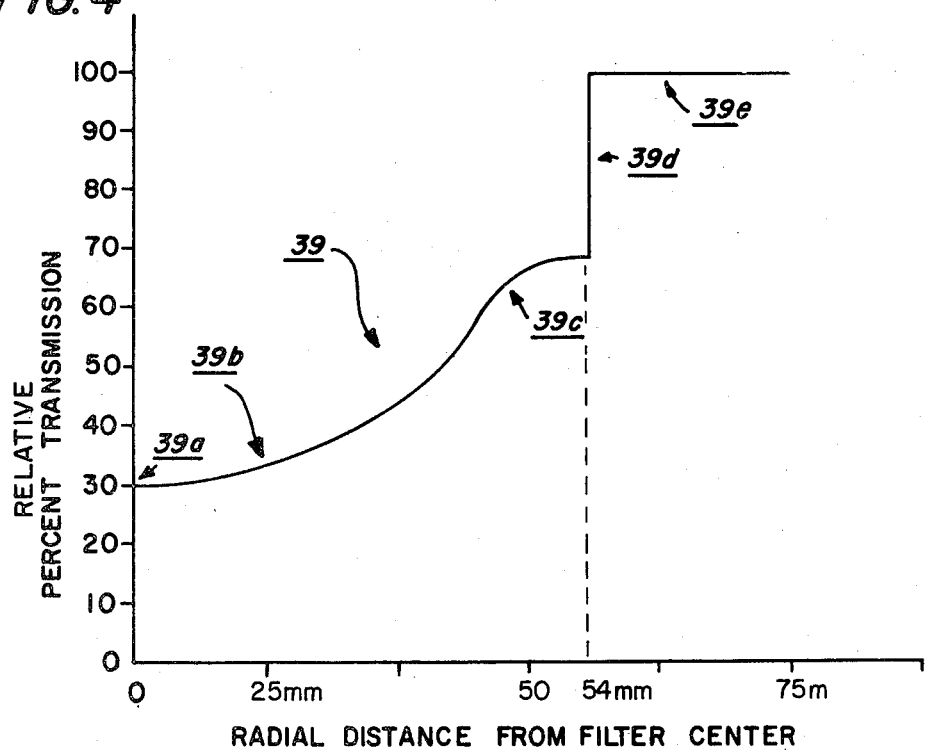
FIG. 4 is a graph illustrating the transmission profile of the filter of FIG. 1.

Referring now to FIG. 4, profile 39 can be characterized as generally increasing as radial distance from filter center increases but with portions of the profile having distinctive characteristics. Segment 39a at 30% transmission is relatively flat; segment 39b rises in slightly irregular fashion; segment 39c levels off and then rises abruptly at transition point 39d (radial distance ≈54 mm) to final segment 39e which is a flat segment representing 100% transmission to the outer edge of the filter. Note that the transmission values are normalized to the transmission of the filter substrate material so that the relative transmission of the substrate material becomes 100%.

Figure 5A:
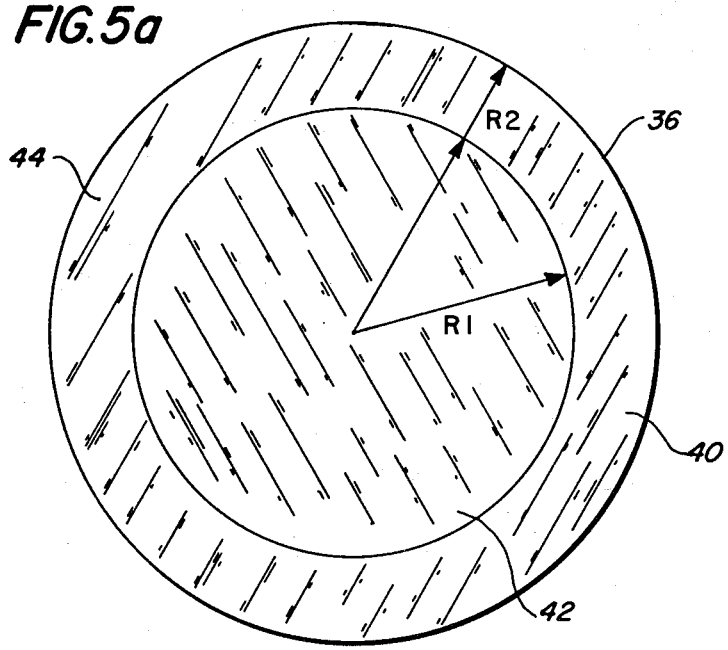
FIGS. 5a and 5b are top and cross-sectional views of the filter shown in FIG. 1.
Figure 5B:
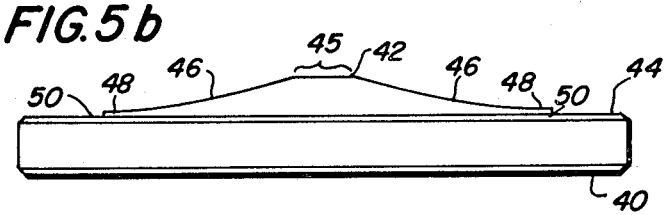

Profile 39 is obtained by forming the filter shown in FIGS. 5a, 5b. Referring to these figures, filter 36 includes a transparent member such as a circular glass plate having a diameter of 150 mm. The plate has a central circular coated area 42 of radius R1 and is surrounded by transparent annular ring 44 within outer radius of R2. Coating 42 is a thin layer of nichrome which is formed by vacuum deposition on the surface of plate 40. The density of coating 42 is maximum in a central region 45, decreases through region 46, levels off in region 48 and ends abruptly at transition edge 50. The thickness of coating 42 will vary from hundreds of microns in central area 45 down to tens of microns in region 48.

In comparing the filter 36 of FIG. 5 with the transmission profile 39 of FIG. 4 it is evident that region 45, 46, 48, 50 and 44 correspond to segments 39a through 39d of profile 39 and to clear segment 39e respectively.

Figure 6:
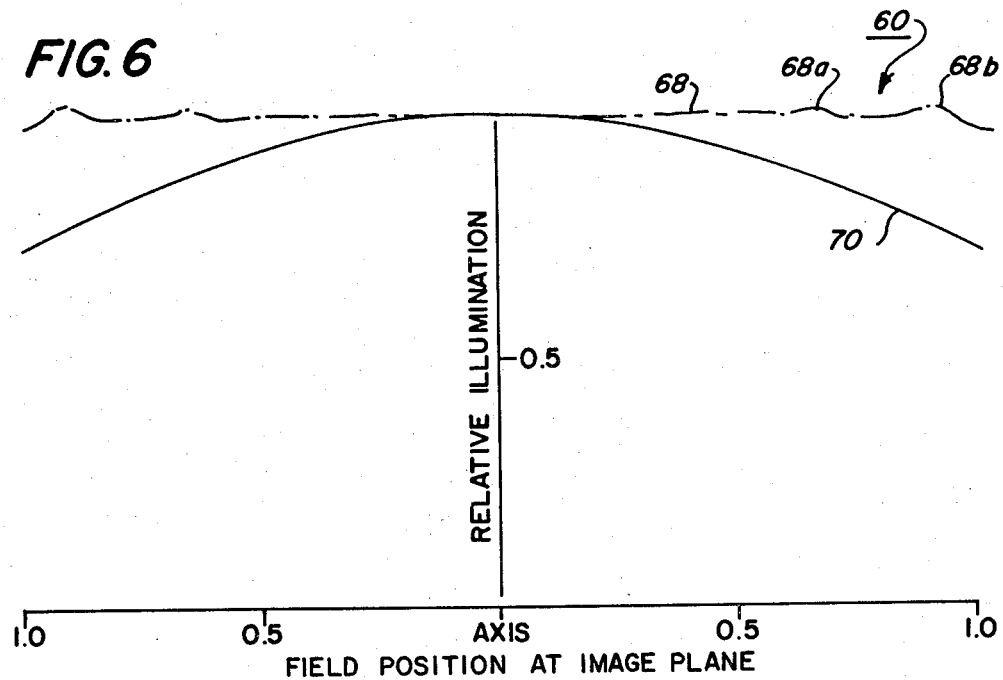
FIG. 6 is a graph illustrating relative illumination at a photoconductor for a system corrected only for $\cos^4$ as compared to a system using the relative illumination filter of the invention.

FIG. 6 illustrates the improved relative illumination of the image plane using the above-described filter (curve 68) and as compared to a lens corrected only for $\cos^4$ dropoff (curve 70). The effect of profile areas 39a, 39b is to maintain uniform illumination up to segment 68a which corresponds to the flattening out of the transmission profile at segment 39c. At this point, the relative illumination rises, slightly representing an overcorrection. The next rise, representing a second overcorrection, is at transition segment 68b (corresponding to 39d of profile 39) where effective transmission sharply rises to 100%. Following this point, the relative illumination begins to drop even though the beam is being completely transmitted through clear glass since the effects of $\cos^4$ and lens distortion are even greater. The overcorrection segments are considered important elements of the invention since they maintain the relative illumination to within the desired ±2%.

In a reduction mode, lens 34 would be moved closer to image plane 38 (in FIG. 1) and the field angle would correspondingly decrease. Since the lens to filter distance is fixed, however, the only result is that the outer portion of the filter would not be transmitting light i.e. a portion of the transmission profile would be "cut off". The required compensated transmission is maintained ensuring uniform illumination for the reduced light area at the image plane.

A particular advantageous feature of the invention is the abrupt termination of the coating 42 at transition point 50 (shown in FIG. 5b). In vacuum disposition techniques wherein their layers of metal such as nichrome and chrome are deposited on substrates, the requirements for increasing transmission require that the coating be made extremely thin in the order of several microns. Such coatings are very difficult to achieve when making filters in production quantities. According to the present invention, the filter transmission near the coating edge 50 is kept relatively low keeping the coating material as thick as possible thereby making it easier to deposit the metal to the desired thickness.

Figure 7:
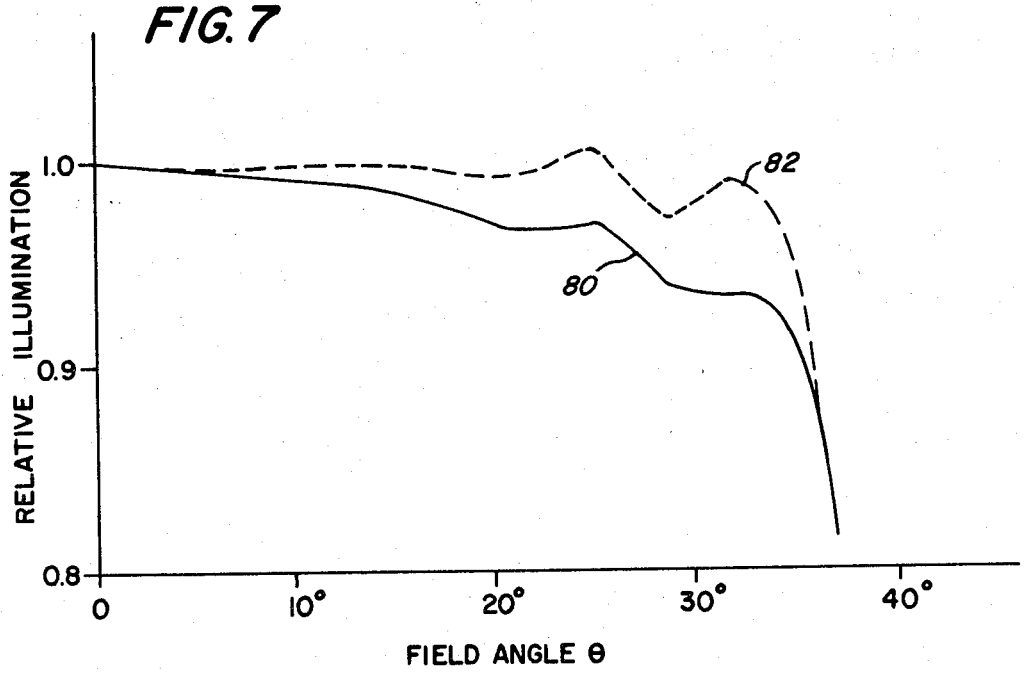
FIG. 7 is a graph illustrating the relative illumination variation with the filter placed at a design location with respect to the lens as compared to a second optimum location.

Another problem is encountered in the fabrication of filters in production quantities. No matter what technique is used in mass producing filters (vacuum deposition, photographic, etc.) there will be some deviation from the desired filter transmission profile due to process variability. This will result in increased variation in the relative illumination at the image plane. Either extremely tight controls must be exercised in the production process (resulting in increased cost) or some method of accounting for these variations must be accomplished. According to another aspect of the invention, it was discovered that at least some of the illumination variation caused by these errors could be partially corrected by adjusting the position of the filter along the optical axis. For example, if filter 36 in FIG. 1 were fabricated with the basic shape of the radial transmission curve correct but all of the transmission values $\approx 3\%$ (absolute) high and the filter was placed at the nominal design position (78 mm from lens exit pupil) the resultant illumination profile in the image plane (assuming perfect illumination in the object plane) illustrated in FIG. 7. There would be a resultant total (maximum) variation in illumination at the image plane of $\approx 9\%$ as shown by plot 80. This can be partially compensated by adjusting the filter to a new position $\approx 2$ mm farther from the lens exit pupil. This reduces the illumination variation to 6% as shown by plot 82. Similarly, if the transmission of the filter is $\approx 3\%$ low, a total illumination variation of $\approx 11\%$ is reduced to around 3% by shifting the filter around 3 mm *closer* to the exit pupil. The curves shown represent a system designed for maximum field angle of 36°.

Although the filter of the invention has been shown in connection with the specific embodiment of FIG. 1, it may be practised in other environments. For example, other illumination sources are possible either within or absent, a housing so long as relative uniform illumination of the platen is obtained. If platen illumination in a particular system is non-uniform, however, the R1 filter profile could be redesigned for the entrance pupil (filter placed on the object side of the lens) or exit pupil distortion (image side of the filter).

What is claimed is:

1. A full frame, wide angle exposure system for a copier wherein a platen is substantially uniformly illuminated by an illumination source said system including:

a lens for projecting an image of a document placed on said platen onto an imaging plane; and a relative illumination filter positioned adjacent said lens and on the optical axis of said lens, said filter consisting of a disc having a central circular area of varying density which provides, for light passing therethrough, a symmetrical light transmission profile which is minimum at the center and which generally increases radially outward, said disc further having a transparent annular area encompassed by the outer edge of said central area and the outer edge of said disc, said transparent area providing maximum transmission light therethrough whereby said filter provides exposure compensation at said imaging plane for the effect of both $\cos^4$ variation as well as transmission variations and exit pupil distoration of said lens.

2. A full frame exposure system as defined in claim 1 wherein the density of said circular area flattens out at its outer edges causing said transmission profile to have a transition point in its profile whereby transmission increases from some previous value to 100%.

3. A full frame exposure system as defined in claim 1 wherein the position of said filter is adjusted to compensate for process variability in manufacturing said filter.

4. In a full frame wide angle copier exposure system wherein a platen is substantially uniformly illuminated and a lens projects an image of a document placed on said platen onto an imaging plane, a method for correcting said system for $\cos^4$ falloff and circularly symmetrical lens non-uniformities introduced at extreme angles comprising the steps of (a) determining relative illumination level of an image projected onto an image plane at a plurality of field angles, (b) defining a filter transmission profile which compensates for both $\cos^4$ and lens non-uniformity effects, (c) altering the density of the central circular portion of a transparent disc so that said disc will provide the required transmission profile of light passing therethrough.

5. In a wide angle exposure system wherein a document in an object plane is substantially uniformly illuminated by an illumination source, an optical projection system including a lens for projecting an image of the document onto an image plane, and a relative illumination filter positioned adjacent said lens and on the optical axis of said lens, said filter consisting of a disc having a central circular area of a density which generally decreases radially outward excepting for a flattening at the center edge and a transparent annular area encompassed by the outer edge of said central area and the outer edge of said disc, whereby said filter provides a symmetrical light transmission profile which is minimum at the center and which gradually increases radially outward, changing abruptly from some previous value to a 100% transmission value at the transition point delineated by the end of the circular area and the beginning of the wholly transparent annular area.

6. A variable density filter for correcting for $\cos^4$ variations and lens exit pupil distortions in a wide angle projection system, the filter comprising a transparent circular support member having a transparent annular outer area and an inner area comprising a variable density circular coating formed on the surface of said support member, said coating having a maximum density in a first, central area, a second coating area of gradually decreasing density extending radially outward, a third relatively uniform coating area extending radially outward to the edge of said circular coating, said edge forming an abrupt transition from some transmission value to the 100% transmission value provided by said transparent annular area.

* * * * *